Jan 6, 1931.  E. RAMSAY  1,787,762
DRIVE FOR ROTARY DUMPS
Filed Sept. 6, 1927  3 Sheets-Sheet 1

Inventor
Erskine Ramsay
By
Attorney

Jan 6, 1931.  E. RAMSAY  1,787,762
DRIVE FOR ROTARY DUMPS
Filed Sept. 6, 1927    3 Sheets-Sheet 2
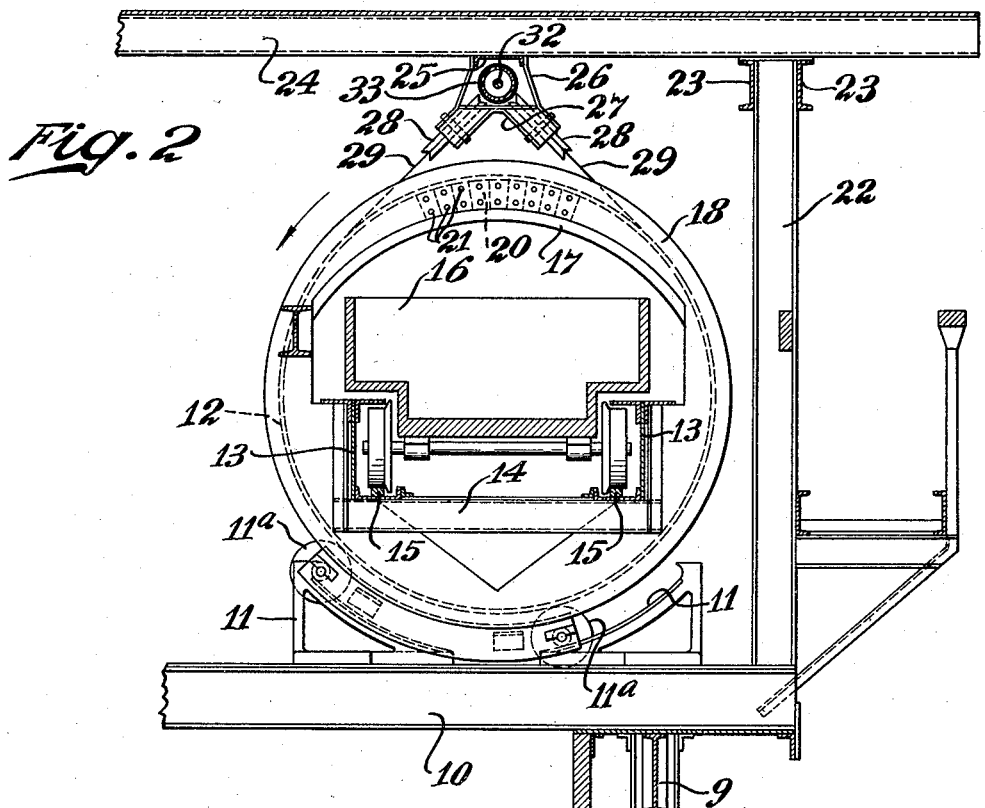
Fig. 2
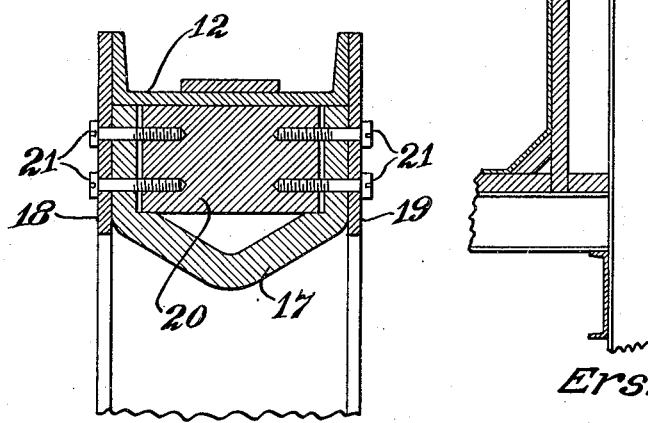
Fig. 3
Inventor
Erskine Ramsay
By  Attorney

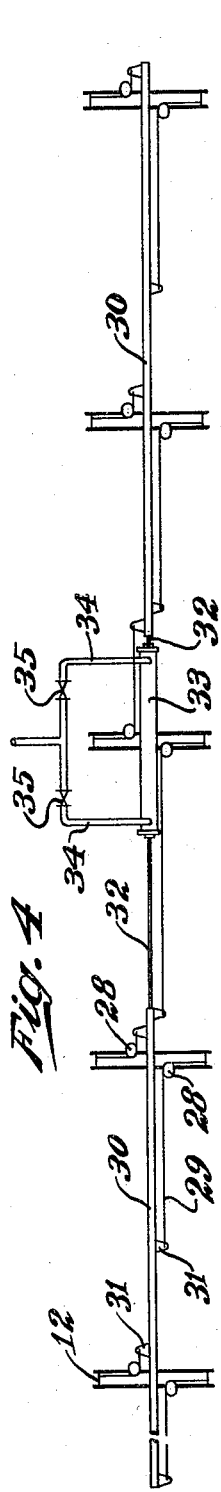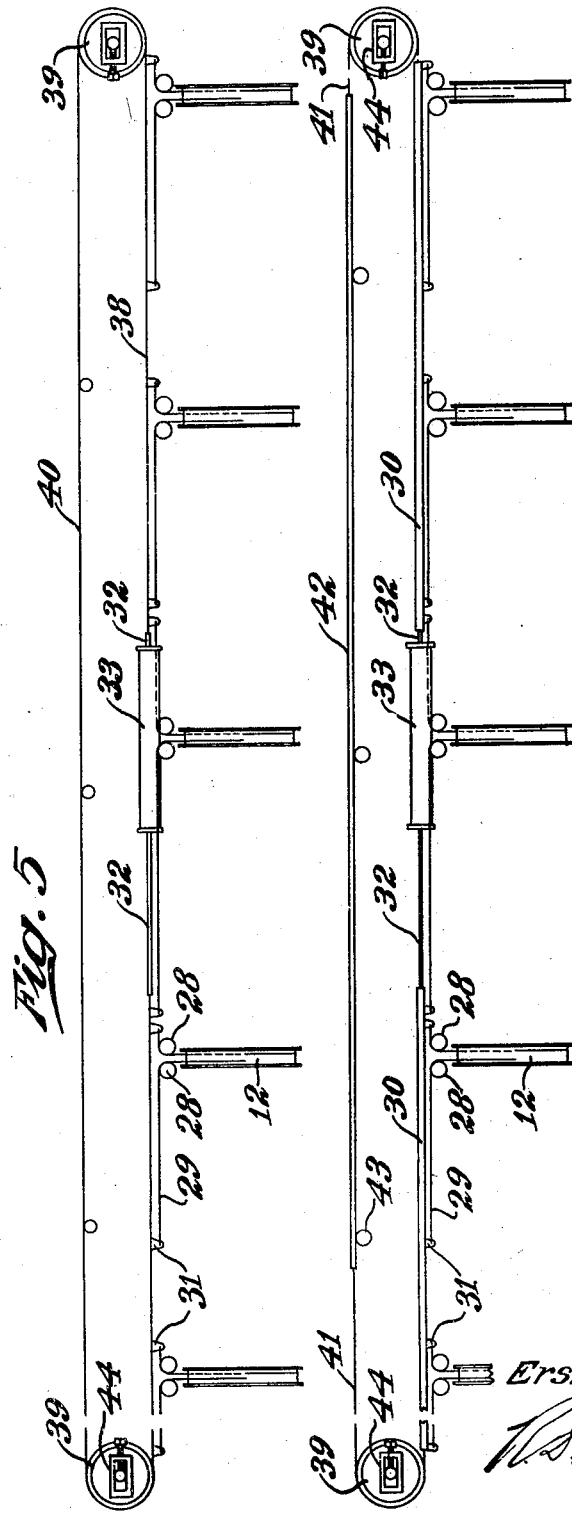

Patented Jan. 6, 1931

1,787,762

UNITED STATES PATENT OFFICE

ERSKINE RAMSAY, OF BIRMINGHAM, ALABAMA

DRIVE FOR ROTARY DUMPS

Application filed September 6, 1927. Serial No. 217,651.

My invention relates to a drive means for rotating dumps about their long axis, and is particularly adapted for use with elongated multi-car dumps which are supported upon rollers or the like and adapted to rotate about a fixed axis.

Various drives have been devised for rotary dumps which have proved satisfactory in the case of relatively short dumps designed to handle only a few mine cars at a time, but, in the development of this art the rotary dump has been called upon to handle entire trips of mine cars and dump them in a single operation and it is now not uncommon practice for rotary dump structures to be designed for receiving and dumping in one operation from 30 to 50 mine cars. Obviously such elongated dump structures present new problems in connection with their operation and it has proven quite difficult to so drive an elongated rotary dump that objectionable torsion would not occur that would damage or materially shorten the life of the dump structure.

The object of my present invention is to simplify and perfect a drive for such long dumps which will be relatively inexpensive in its structure, easy to mount in place, suitable to serve as an overhead drive that is removed from injury from the material dumped, and which is capable by means of a single power driven actuator means to rotate the dump in both directions and positively control its operation throughout.

More particularly, my invention contemplates the utilization of a single power driven actuator adapted to be reciprocated by any suitable motor mechanism and having connected to it at intervals cables or like flexible elements which are guided in reverse directions by pulleys and passed in opposite directions about the dump, whereby the movement of the actuator in one direction will pay off the operating connections leading therefrom in the direction of its motion and will pull on the operating connections, leading in a direction opposite to its motion, to rotate the dump in the desired direction. Preferably, such an actuator is formed by a suitable rigid member suitably guided and connected to one or more operating cylinders, but it is within the contemplation of my invention that such operating connection may be formed by an endless cable chain or the like, or a combination of rigid and flexible elements whereby the actuator will operate always under tension.

My invention in its preferred embodiments will be more readily understood by reference to the accompanying specification and claims, and to the drawings wherein I have illustrated only the preferred embodiments of my invention.

Referring to the drawings:—

Fig. 2 is a cross-sectional view taken on the line II—II of Fig. 1.

Fig. 3 is an enlarged cross-sectional view taken on the line IV—IV of Fig. 2.

Fig. 4 is a reduced plan view showing in detail the drive co-ordinated with the riding rings of the dump, the details of the dump cage structure being omitted for the sake of clearness.

Fig. 5 is a plan view corresponding to Fig. 3 of a modified type of drive employing an endless flexible actuator; and Fig. 6 is a view corresponding to Fig. 5, showing a drive employing an actuator formed of rigid and flexible elements.

Fig. 7 is a detailed view, showing the adjustable attachment of the cables to the dump rings.

Similar reference numerals refer to similar parts throughout the drawings.

Figure 1:
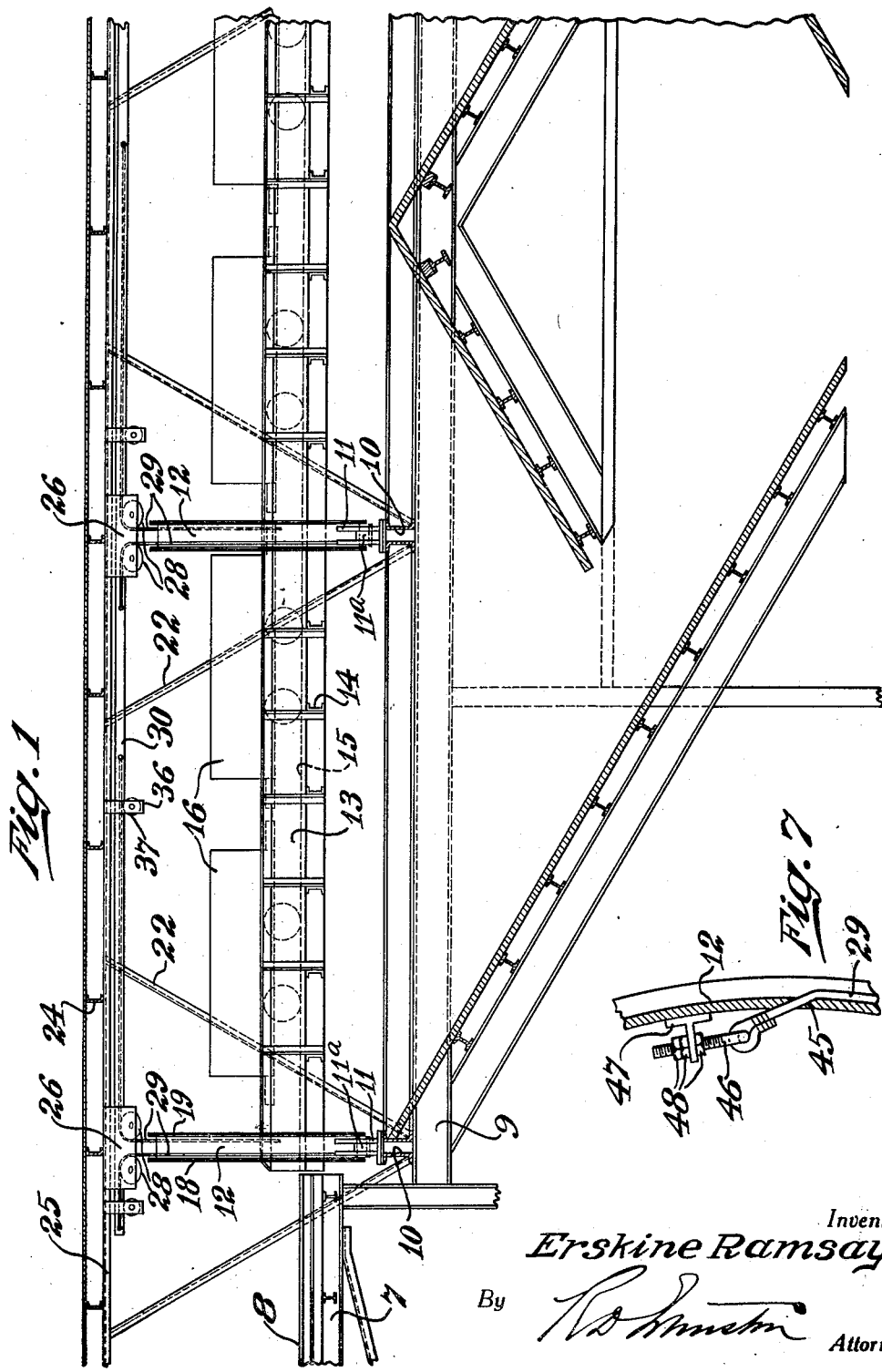
Fig. 1 shows in side elevation one end of a rotary dump of the elongated type equipped with my improved operating mechanism comprising a rigid push and pull actuator.

In the embodiments of my invention illustrated in the drawing, which are obviously susceptible of wide variation without departure from the essential features of this invention, I show a tipple structure 7 supporting fixed mine tracks 8 and structural frame members 9 and 10 upon which are mounted the curved track supports 11 for the rollers 11a on which the riding rings 12 of the dump cage rest. The dump cage, as formally illustrated, comprises a plurality of these riding rings 12 which are tied together by longitudinal structural trusses 13 and carry suitable transverse channels 14 upon which are mounted the tracks 15 which support the mine cars 16 within the dump. The riding rings, as made up, comprise an annular U-shaped channel member 17 having its flanges out-turned and bolted to side plates 18 and 19, and within the space provided between the plates across the top of each riding ring, when in upright position, I mount an arcuate channel member 17, and I insert a plurality of counter-weights 20 for the dump in this channel 17 which are held in position by cap screws 21. A plurality of these counter-weights are employed so that one or more can be removed and the dump thereby unbalanced on either side or held in any desired balance. The track supporting channels 14 are arranged on relatively close centers, whereas the riding rings 12 are spaced on wide centers. The roller supports for the dump are not described in detail as they form no part of my present invention.

In the design shown of my actuating mechanism, the tipple structure is provided with diagonal traces 22 which are connected below to the members 10 and adapted to support an overhead structural framework comprising longitudinal side channels 23 which support at intervals cross channels 24, which in turn are cross connected centrally above the dump by a longitudinal channel 25 attached to the underside of the channels 24. At intervals guide frame brackets 26 are attached to the channel 25 and support a depending V-shaped bearing plate 27 between which and the brackets 26 I pivotally mount the oppositely inclined pulleys 28, said pulleys being in staggered relation as viewed from the side, and each being inclined in a place tangent to the adjacent periphery of the dump riding rings towards which they direct the dump-controlling cables, chains or flexible connections 29 which can be passed partway or several times about the dump rings. As shown, these connections 29 lead from opposite sides partway about the dump ring and are attached thereto by suitable means. Preferably the cable end is passed through an inclined slot 45 and is clipped to an I-bolt 46 inserted through a bracket 47 attached to the inner side of the riding ring and adjustably held in position by nuts 48 which will take up any slack in each operating cable. The cables at their other ends are led about the pulleys 28 and extend therefrom substantially parallel with and are connected to a common reciprocal control element, which, in the form shown, comprises an I-beam actuator 30. The cables leading in one direction around the dump all extend in the same direction from their respective pulleys to their point of attachment to the actuator, and the cables passing around the dump in the opposite direction extend from their respective guide pulleys in the opposite direction from the first mentioned cables to their point of attachment to the actuator. The point of attachment of each cable to the actuator is so spaced from that cable's respective pulley that as the actuator reciprocates the cable end does not pass beyond its guide pulley. The cables are shown connected to brackets 31 attached to the actuator 30 and this actuator is formed by two I-beams which are connected to the opposite ends of a piston 32 working in a fluid pressure control cylinder 33 mounted overhead and operated by fluid pressure delivered to the ends thereof through pipes 34 under control of any suitable reversing and exhaust valve mechanism, such as the three-way valves formally illustrated at 35. Pulley supporting brackets 27 are mounted opposite each riding ring and at suitable intervals the actuator is supported by brackets 36 dependent from the channel 25 and carrying roller supports 37 which guide the actuator and confine it to a rectilinear movement.

In Fig. 4 the actuator is shown at the extreme position of its travel to the left and the ends of the cables leading about the dump in one direction are shown with their points of attachment to the actuator close to their respective pulleys 28, while the other cables have their points of attachment shown remote from their respective pulleys. It therefore follows that when the power is reversed in the cylinder 33 the actuator will be moved to the right and the cable ends leading to the right will commence to be pulled by the actuator and to rotate the dump while the cable ends leading to the left are gradually paid off. The reverse occurs when the pressure in the cylinder is changed and the actuator moved to the left. All movements of the actuator result in the application of a positive pull uniform for the whole length of the dump to its riding rings to rotate it free of torsional strain in the desired direction. The cables are directed so that the greatest load imposed on the drive mechanism will be borne by the actuator working under tension and the lighter duty by the actuator working under compression. In like manner, when the dump tends to move by gravity, or when the valve mechanism is set to retard the movement of the actuator so as to slow up and stop the dump, all cables will be under the control of the actuator and will prevent torsional strain on the dump.

If it be desired to have the actuator work entirely under tension, then the forms of actuator may be employed as shown in Fig. 5 or 6. In Fig. 5 I show the ends of cables 29 connected in the manner already described to the lower flight 38 of an endless chain or cable which passes about end sprockets or pulleys 39 and has its upper flight 40 suitably supported. The ends of the chain or cable forming the lower flight 38 are connected to opposite ends of the actuating piston 32 and thus the pull on the piston in either direction causes the actuator to work under tension in pulling the dump in both directions.

In Fig. 6 I show the same actuating mechanism disclosed in Fig. 4, with the exception that I attach to the ends of the rigid actuator 30 chains or cables 41 which pass about the end sprockets or pulleys 39 and are connected overhead to the ends of a rigid bar 42 supported at intervals on rollers 43. The pulleys 39 may be provided with suitable tension adjusting mechanism 44 which will take up slack in the flexible actuators.

My control mechanism is adapted to serve as a brake or retarder to control the stopping of the dump in either direction. To gain this end, the valves are set to either admit or cut off pressure on one end of the cylinder and to trap the air in or regulate its exhaust from the other end of the cylinder towards which the piston is moving. The coordinated connections will function to prevent torsion of the dump while turning by gravity or being retarded, just as during the drive of the dump.

Though I have described with great particularity the details of the embodiment of the invention herein shown, it is not to be construed that I am limited thereto, as changes in arrangement and substitution of equivalents may be made by those skilled in the art without departing from the invention as defined in the appended claims.

What I claim is:—

1. An operating mechanism for an elongated rotary dump which has a plurality of roller supports upon which it is rotatable about its fixed long axis, a fluid pressure controlled actuating and retarding element mounted to reciprocate parallel with said axis of the dump and substantially coextensive in length therewith, flexible connections attached at intervals to said element and leading about the dump in opposite directions, and roller guides for said connections adjacent to said element, the connections passing in one direction about the dump being led from their guides in one direction substantially parallel with and connected to said element and the other flexible connections being led in the opposite direction from their guides substantially parallel with and connected to said element, whereby its reciprocation controls positively the rotation in both directions of the dump.

2. In an operating mechanism for rotary dumps, a power driven reciprocable actuator extending parallel with the dump and substantially coextensive in length therewith, a plurality of flexible dump driving connections attached at intervals to said actuator and divided into two groups, one group leading lengthwise of the dump in one direction and then clockwise about the dump, the other group leading lengthwise of the dump in the opposite direction and then counterclockwise about the dump, and guides about which said connections pass to the dump.

3. A dump operating mechanism according to claim 1, in which the fluid pressure control means for the actuator comprises a cylinder having its piston rod projecting from both ends and in which the actuating and retarding element comprises rigid members substantially equal in length which are connected to the ends of said piston rod.

In testimony whereof I affix my signature.
ERSKINE RAMSAY.